United States Patent [19]

Swithenbank et al.

[11] Patent Number: 4,484,471
[45] Date of Patent: Nov. 27, 1984

[54] FLOW METERS

[76] Inventors: Joshua Swithenbank, Barnfield House, Barnfields; David S. Taylor, 54 Kingfield Rd., both of Sheffield, England

[21] Appl. No.: 419,532

[22] Filed: Sep. 17, 1982

[30] Foreign Application Priority Data

Sep. 26, 1981 [GB] United Kingdom ............... 8129137

[51] Int. Cl.³ .................. G01F 1/68; G01K 17/00
[52] U.S. Cl. ............................... 73/204; 374/39
[58] Field of Search ........................ 73/204; 374/39

[56] References Cited

U.S. PATENT DOCUMENTS 2,633,747  4/1953  Lindstrom .................. 73/204 X
4,085,613  4/1978  Richard ........................ 374/39
4,355,908  10/1982 Weisser et al. .................. 374/39

FOREIGN PATENT DOCUMENTS 2330498  1/1975  Fed. Rep. of Germany ........ 374/39
WO80/02071 10/1980 PCT Int'l Appl. ................ 374/39
WO82/00714  3/1982 PCT Int'l Appl. ................ 374/39

Primary Examiner—Herbert Goldstein
Attorney, Agent, or Firm—Kemon & Estabrook

[57] ABSTRACT

A meter for measuring the rate of flow of a fluid comprises an inlet and outlet for the fluid, a surface intermediate of said inlet and outlet over which the fluid will flow in passing from inlet to outlet, a second surface maintained at a different temperature to the first surface and being connected thereto by means of a thermal bridge and means for measuring the temperature of fluid flowing over the first surface, the second surface and at an intermediate point on the thermal bridge, so as to provide a measure of the thermal insulative effect of the boundary layer formed by the flow of fluid over the first surface and hence of the rate of flow of the fluid.

15 Claims, 4 Drawing Figures

FLOW METERS

This invention relates to flow meters.

According to one aspect of the present invention a meter for measuring the rate of flow of a fluid comprises an inlet and outlet for said fluid; a first surface intermediate of said inlet and outlet over which the fluid will flow in passing from inlet to outlet; a thermal bridge connecting said first surface to a second surface; means associated with said second surface for maintaining a temperature differential between said first and second surfaces; said thermal bridge comprising a relatively good thermally conductive portion connected thermally to said first surface and a relatively poor thermally conductive portion between the relatively good conductive portion and the second surface; the thermal bridge being insulated so that heat flow is effectively restricted to the path defined thereby between the first and second surfaces; a temperature measuring device arranged to be responsive to the temperature at an intermediate point in the relatively conductive portion of the bridge; and temperature measuring device arranged to measure the temperature of the fluid flowing over the first surface and the temperature of the second surface, respectively.

When the fluid flows over the first surface, the viscous motion between the fluid and the surface creates a boundary layer. The thickness of this boundary layer depends on the velocity of the fluid, the boundary becoming thinner as the velocity of the fluid increases. This boundary layer acts as a thermal insulating layer between the surface and the bulk of the fluid, the degree of insulation depending on the thickness of the boundary layer and thus the velocity of the fluid. This variable resistance to heat flow across the first surface will affect the flow of heat across the thermal bridge and consequently the temperature at the intermediate point on the thermal bridge. A plot of the ratio of the temperature drop between the intermediate point (Tm) and the second surface (Tc) and the temperature drop between the fluid flowing over the first surface (Th) and the intermediate point (Tm) (ie. Tm−Tc/Th−Tm) against fluid flow rate, gives a suitable curve for calibration of the meter. However, other ratios, for example Tm−Tc/Th−Tc could be used, for this purpose.

Preferably the relatively good conducting portion of the thermal bridge has a conductivity of at least ten times that of the relatively poor conducting portion. This may be achieved by selecting materials of the appropriate conductivity and/or by adjusting the dimensions of the portions. For example, the relatively poor conductivity portion may be formed from a relatively thin layer of heat insulating material or alternatively the bridge may be of homogeneous construction, the relatively poor conducting portion being of reduced width.

Where the temperature of the fluid flowing over the first surface varies, it is convenient to arrange for the temperature of the second surface also to vary, although the second surface may be held at a contrast temperature which is outside the operational range of temperature of the fluid.

The temperature of the second surface may be maintained at a different temperature than the first surface, by means of a secondary fluid flow. This form of meter is particularly suitable for use in closed systems, for example heating systems, where a fluid is supplied at one temperature and is returned at a different temperature. In such circumstances, the meter may be used to measure the rate of flow of fluid through the system, the incoming fluid being arranged to flow over the first surface, while the outgoing fluid flows over the second surface, in order to create the necessary temperature differential. In such arrangements, the flow meter may be adapted to act as a heat meter, the heat used in the system being a function of the flow rate and the difference between the inlet and outlet temperature from the system which may be calculated by a suitable processor. Where a secondary flow of fluid is used to maintain the second surface at a different temperature than the first, means must be provided to overcome the insulative effect of the boundary layer, at this surface. By providing a thermally conductive body of large surface area, over which the secondary fluid flows, and which is in thermal contact with the second surface, the second surface may be maintained at substantially the temperature of the secondary fluid flow, no appreciable temperature variation occuring due to change in velocity of the secondary fluid flow.

The invention is now described, by way of example only, with reference to the accompanying drawings in which.

Figure 1:
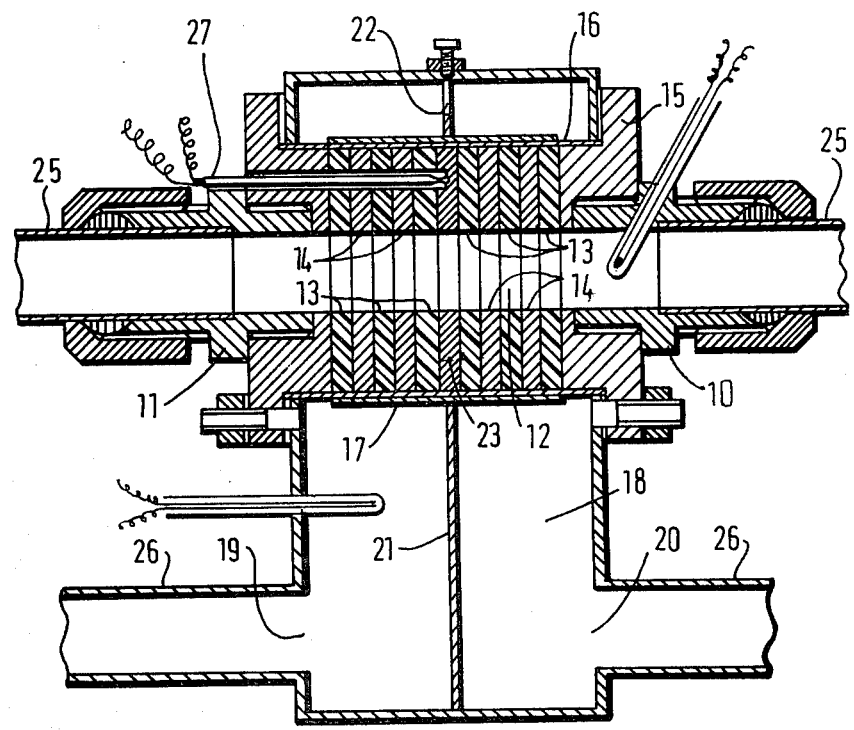
FIG. 1 illustrates a flow meter formed in accordance with the present invention.

The flow meter illustrated diagramatically in FIG. 1 comprises an inlet 10 and outlet 11 interconnected by a direct passageway 12, this passageway being formed by the inner diameters of a stack of alternate nylon and copper washers 13 and 14 respectively, these washers being clamped together in a nylon housing 15. A nylon sheath 16 surrounds the washers 13, 14 on their outer diameter and a copper sheath 17 surrounds the nylon sheath 16. The stack of washers 13, 14 is surrounded by a fluid tight chamber 18 which is provided with an inlet 19 and outlet 20. The chamber 18 is divided into two by a copper baffle 21, a hole 22 being provided through the baffle 21 at a point remote from the inlet and outlet 19, 20, so that fluid passing through the chamber 18, from inlet 19 to outlet 20, will flow around the outer diameter of the stack of washers 13, 14.

A temperature measuring device, for example thermocouple 27 is provided at a point intermediate of the inner and outer diameters of the central copper washer 23 of the stack of washers 13, 14. Further temperature measuring devices (not shown) are provided at the inlets 10 and 19, so that the difference between temperatures at the intermediate point in the copper washer 23 (Tm) and at the inlet 19 (Tc) and the difference between the temperature at the inlet 10 (Th) and intermediate point (Tm) can be determined.

The meter described above is connected in a closed system, for example a heating system in which hot fluid flows into the system and relatively cool fluid is returned from the system. The inlet pipe 25 to the system is connected across the inlet 10 and outlet 11 of the meter, the connection between the inlet pipe 25 and the inlet 10 and outlet 11 being made of a heat insulating material such as nylon, so that heat will not be conducted along the pipe 25, to the stack of nylon and copper washers 13, 14. The return pipe 26 from the system is connected across the inlet 19 and outlet 20 of the chamber 18. In this manner, hot fluid entering the closed system will flow through passageway 12 over the inner surfaces of the stack of nylon and copper washers 13, 14 and copper washer 23 and relatively cool fluid leaving the closed system will flow through the chamber 18 around the outer diameters of the stack of washers 13, 14 and copper washer 23. As the system is closed, the rate of flow of incoming fluid will be equal to the rate of flow of outgoing fluid.

In operation, the internal surfaces of the stack of washers 13, 14 is heated by the hot fluid and the external surfaces cooled by the relatively cold fluid, the opposite faces of the stack of washers 13, 14 and copper washer 23 thereby being held at different temperatures. The copper washers 14 on either side of the copper washer 23, will be held at similar temperature gradients to the central copper washer 23 and will act as guard rings, ensuring that the heat flow through the copper washer 23 will be radial and consequently there will be a smooth temperature gradient between its inner surface and outer surface. The temperature (Tm) which is intermediate of the inner and outer surface of washer 23, will consequently be a function of the temperature at the inner and outer surfaces and of the temperature gradient across the washer 23.

As the fluid flows over the inner surfaces of the washers 13, 14, and copper washer 23 a boundary layer is formed, the thickness of which is a function of the velocity of the fluid. This boundary layer creates an insulating layer between the bulk of the fluid and the inner surface of the washer 23 and consequently the temperature of this surface of the washer 23 will be below that (Th) of the bulk of the fluid. The difference in temperature between the fluid and the surface of the washer 23 will therefore give a measure of thickness of the boundary layer and consequently the velocity of the fluid. As the temperature (Tm) intermediate of the inner and outer surfaces of the copper washer 23 varies with the temperature of the inner surface of the washer 23, this will also vary with the velocity of the fluid over the inner surface. A plot of $Tm-Tc/Th-Tm$ against the fluid flow rate, produces a curve as illustrated in FIG. 2, which may be used to calibrate the flow meter.

The nylon sheath 16 surrounding the stack of washers 13, 14, 23 reduces the temperature differential across the copper washer 23, thereby increasing the sensitivity of the temperature (Tm) intermediate of the inner and outer diameters of the copper washer 23 with respect to variation in the temperature at the inner surface of the copper washer 23 and increasing the sensitivity of the meter. In the apparatus described above it is assumed that the temperature of the outer surface of the copper sheath 17 surrounding the nylon sheath 16 and washer 23, is equal to the temperature of the fluid flowing through the chamber 18. As with the fluid flow over the inner surface of the washer 23, a boundary layer will exist between the fluid flowing through the chamber 18 and the outer surface of the copper sheath 17. However, heat transfer between the copper baffle 21, which is of relatively large surface area and is in thermal contact with the copper sheath 17 and the fluid flowing through the chamber 18, ensures that the copper sheath 17 is maintained at substantially the same temperature as the fluid flowing through the chamber 18 and there is no appreciable variation in temperature with variation in flow rate. This function need not necessarily be carried out by the baffle 21, but could be performed by any body of large surface area and good thermal conductivity which is exposed to the secondary fluid flow and is in thermal contact with the outer surface of the thermal bridge. For example, the copper sheath 17 may be provided with heat exchange fins.

Figure 2:
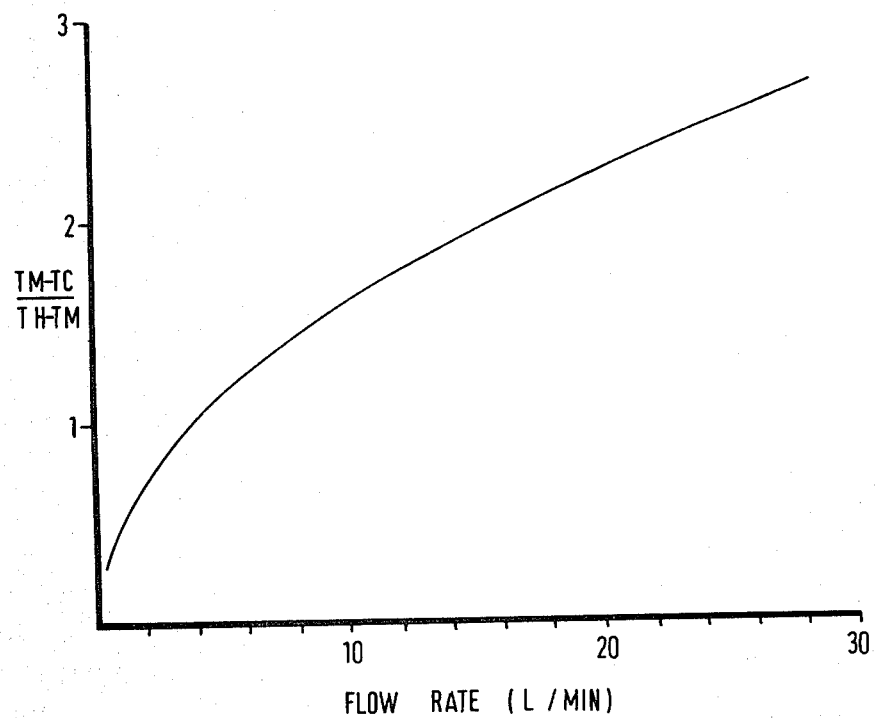
FIG. 2 illustrates the calibration curve for the flow meter illustrated in FIG. 1.

Using the calibration curve shown in FIG. 2 and suitable electronic processing circuits, the meter may be arranged to give a readout of the fluid flow rate. Alternatively, as the heat supplied by the closed circuit is proportional to the flow rate and the temperature differential between the inlet and return from the system (Th−Tc) the electronic circuitry may be arranged to give a readout of the heat consumed by the system.

Figure 3:
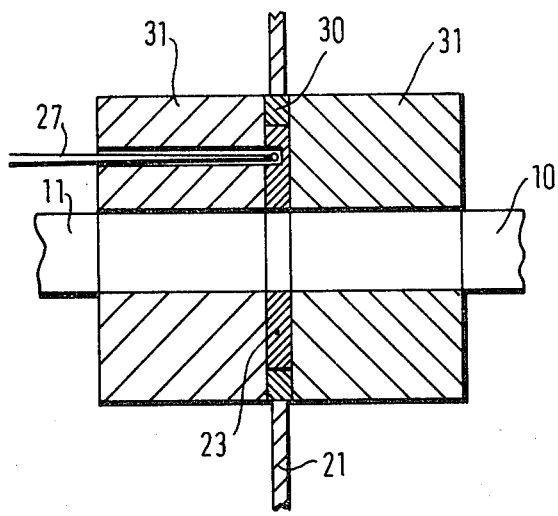
FIG. 3 illustrates a modification to the thermal bridge used in the embodiment illustrated in FIG. 1.

In the modification illustrated in FIG. 3, the thermal bridge comprises a copper washer 23, the inner surface of which is exposed to fluid flowing from the inlet 10 to outlet 11. A stainless steel washer 30 is a press fit around the copper washer 23. The copper/stainless steel washer assembly 23/30 is mounted in the chamber 18 so that the baffle 21 is in thermal contact with the outer surface of the stainless steel washer 30 and maintains that surface at the temperature Tc of the fluid flowing through the chamber 18, in the manner described above. Two blocks of insulating material 31 with bores corresponding to the bore of the copper washer 23 are positioned on either side of the copper/stainless steel washer assembly, in order to define a passage between the inlet 10 and outlet 11 and also to ensure that heat will flow radially through the copper/stainless steel washer assembly 23/30. A temperature measuring device 27 is connected to the copper washer 23, as described with reference to FIG. 1.

This modified thermal bridge functions in exactly the same manner as the bridge described with reference to FIG. 1. The stainless steel washer 30 forms a portion of relatively poor thermal conductivity thus reducing the temperature differential across the copper washer 23 and thereby increasing the sensitivity of the intermediate temperature Tm, in the same way as the sheath 16 described with reference to FIG. 1. In a further alternative the thermal bridge may be of homogeneous construction, a relatively poor conductive outer portion being provided by reducing the cross-section of that portion. The use of thick insulating blocks in the embodiment illustrated in FIG. 3 avoids the need for the guard rings 14 described with reference to FIG. 1.

Figure 4:
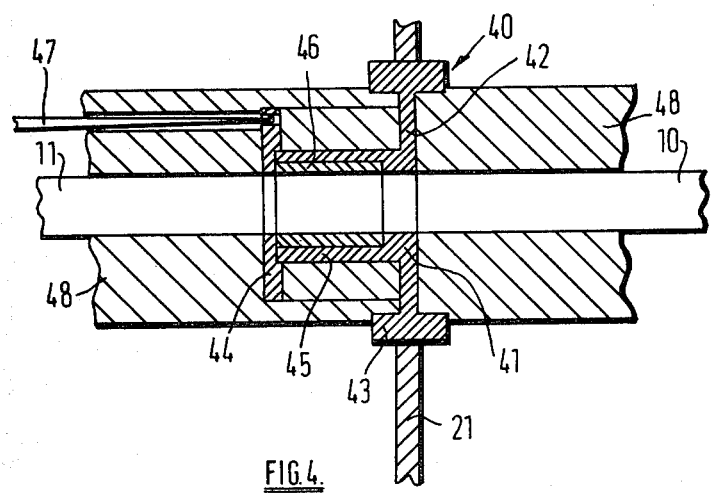
FIG. 4 illustrates an alternative form of thermal bridge which may be used in accordance with the present invention.

The sensitivity of the meter may be further enhanced by measuring the intermediate temperature Tm on a shunt between the first surface and the thermal bridge. This may be done in the manner illustrated in FIG. 4. In this embodiment the thermal bridge comprises a main ring 40, made of brass. The ring 40 has an inner portion 41, the inner surface of which is exposed to fluid flowing from inlet 10 to outlet 11. The inner portion 41 of ring 40 is connected by a relatively thin central portion 42 which forms the relatively poor conductive portion of the bridge, to an outer portion 43. The main ring 40 is mounted in the chamber 18 so that the baffle 21 is in thermal contact with the outer portion 43, for the reasons given above.

A secondary ring 44 made of copper is positioned co-axially of the main ring 40, but spaced therefrom towards the outlet 11. The inner surface of this secondary ring 44 is also exposed to fluid flowing from inlet 10 to outlet 11. The secondary ring 44 is connected to the inner portion 41 of the main ring 40 by a thin brass sleeve 45. The brass sleeve 45 is insulated from fluid flowing from inlet 10 to outlet 11 by insulating sleeve 46. A temperature measuing device 47 is provided at a point on the secondary ring 44. The main and secondary rings 40, 44 are surrounded by insulating blocks 48 which serve to define a passage between inlet 10 and outlet 11 over the inner surfaces of the rings 40, 44 and also to ensure that heat flows between the inner and outer surfaces of the main ring 40 via the central portion 42 and between the inner surface of the secondary ring 44 and outer surface of the main ring 40, via the sleeve 45 and central portion 42.

In this embodiment, both the inner surfaces of the main ring 40 and secondary ring 44 are subject to boundary layer conditions and consequently the heat transmitted across these surfaces will be a function of their areas and of the rate of flow of fluid. The heat flow across the inner surface of the main ring 40, will set up a temperature gradient across the main ring 40 the same way as in the bridges described with reference to FIGS. 1 and 3. The variation in heat transfer across the surface resulting from variation in flow rate, will consequently result in a variation of the temperature in the inner portion 41 of the main ring 40 at the point which is connected to the sleeve 45. The shunt formed between the inner surface of the secondary ring 44 and the inner portion 41 of the main ring 40, by secondary ring 44 and sleeve 45, will consequently be subjected to a temperature dfferential which varies at each end, with variations in the flow. As a result, the intermediate temperature Tm measured in the secondary ring 44 by temperature measuring device 47, will be a second order function of the rate of flow of fluid over the inner surfaces of the rings 40 and 44. The sensitivity enhancement thus achieved may be adjusted by varying the surface areas of the main ring 40 and secondary ring 44 which are exposed to fluid flowing from inlet 10 to outlet 11. In this way the sensitivity over the operating range of the meter may be improved and in particular the saturation in signal at higher flow rates can be reduced to extend the working range of the meter.

Various modifications may be made to the above embodiments without departing from the invention. For example, alternative thermally conductive and heat insulating materials may be used for the various components. The surface of the components which are exposed to the fluid flows, may be coated with thin layers of thermally conductive corrossion resistant materials where necessary. Alternatively by selecting appropriate combinations of materials, the components themselves may be formed from corrossion resistant materials.

The operating range or capacity of meters formed in accordance with the present invention is dependent on the surface area of the surface exposed to fluid flowing from inlet 10 to outlet 11. The meter may consequently be designed, for a specific purpose, simply by varying the surface area, for example by varying the thickness or internal diameter of the washer 23.

We claim:

1. A meter for measuring the rate of flow of a fluid comprising an inlet and outlet for said fluid; a first surface intermediate of said inlet and outlet over which the fluid will flow in passing from inlet to outlet; a thermal bridge connecting said first surface to a second surface; said second surface maintained at a different temperature to the first surface by means of a secondary fluid flow; said thermal bridge comprising a relatively good thermally conductive portion connected thermally to said first surface and a relatively poor thermally conductive portion between the relatively good conductive portion and the second surface; the thermal bridge being insulated so that heat flow is effectively restricted to the path defined thereby between the first and second surfaces; a temperature measuring device arranged to be responsive to the temperature at an intermediate point in the relatively conductive portion of the bridge; temperature measuring devices arranged to measure the temperature of the fluid over the first surface and the temperature of the second surface respectively; and means being provided in association with said second surface to maintain that surface at substantially the same temperature as the secondary fluid flow.

2. A meter according to claim 1 in which the primary fluid flow passing over the first surface and the secondary fluid flow are provided by the inlet and return lines of a closed system in which heat is transferred to or from the fluid flowing through the system.

3. A meter according to claim 1 in which a body of relatively good thermal conductive and large surface area is in thermal contact with said second surface on the opposite side thereof to the relatively poor thermally conductive portion of the thermal bridge and is arranged so that the second fluid flow will pass thereover, so as to maintain the second surface at substantially the temperature of the secondary fluid flow.

4. A meter according to claim 1 in which the relatively good thermally conductive portion of the bridge has a conductivity of at least ten times that of the relatively poor thermally conductive portion.

5. A heat meter for measuring the amount of heat supplied by or to a fluid flowing through a closed system comprising a meter as claimed in claim 1, said meter being adapted to be connected across the inlet and return lines of the closed system, so that fluid at one temperature will flow over the first surface and fluid at a different temperature will flow over the second surface, and processing means to calculate the heat received or delivered by the fluid flowing through the system, from the rate of flow of fluid and temperature difference between the inlet and return lines measured.

6. A meter for measuring the rate of flow of a fluid comprising an inlet and outlet for said fluid; a first surface intermediate of said inlet and outlet over which the fluid will flow in passing from inlet to outlet; a thermal bridge connecting said first surface to a second surface; means associated with said second surface for maintaining a temperature differential between said first and second surfaces; said thermal bridge comprising a relatively good thermally conductive portion connected thermally to said first surface and a relatively poor thermally conductive portion between the relatively good conductive portion and the second surface; said thermal bridge being insulated so that heat flow is effectively restricted to the path defined thereby between the first and second surfaces; a temperature measuring device arranged to be respondive to the temperature at an intermediate point in the relatively conductive portion of the bridge; temperature measuring devices arranged to measure the temperature of the fluid flowing over the first surface and the temperature of the second surface respectively; said second surface being maintained at a different temperature to the first surface by means of a secondary fluid flow, means being provided in association with said second surface to maintain that surface at substantially the same temperature as the secondary fluid flow; said first and second surfaces and said thermal bridge being provided by an annular disc;

said disc having an inner portion of relatively good thermal conductivity surrounded by a portion of relatively poor thermal conductivity; the disc being arranged between the inlet and outlet of the meter; so that fluid flowing through the meter will pass over the inner cylindrical surface of the relatively good thermally conductive portion of the disc, this surface forming said first surface; the disc being located within a chamber forming a path for the secondary fluid flow, said path passing over the outer cylindrical surface of the disc, this outer surface forming said second surface.

7. A meter according to claim 6 in which the outer portion of the thermal bridge is formed from an annular disc or sheath of material which has a poor thermal conductivity relative to the material forming the inner portion of the disc.

8. A meter according to claim 6 in which the disc is of homogeneous construction, the portion of relatively poor conductivity being of reduced cross-section.

9. A meter according to claim 6 in which a large plate of relatively good thermal conductivity extends into the chamber surrounding the annular disc and is in thermal contact with the outer cylindrical surface of the annular disc.

10. A meter according to claim 9 in which the plate forms a baffle to direct the secondary fluid flow through the chamber and around the outer cylindrical surface of the annular disc.

11. A meter according to claim 6 in which a heat measuring device is arranged to measure the temperature at a point on the relatively good conductive portion of the disc.

12. A meter according to claim 6 in which a heat measuring device is arranged to measure the temperature at a point on the thermal shunt which extends between the first surface and the intermediate point on the relatively conductive portion of the thermal bridge.

13. A meter according to claim 12 in which a second annular disc of relatively good thermal conductivity is positioned adjacent to, but spaced from the thermal bridge, the inner cylindrical surface of said second disc being exposed to the flow of fluid from inlet and outlet; the second annular disc is connected to an intermediate point on the relatively good conducting portion of the bridge by a link of relatively poor thermal conductivity, the temperature measuring device being arranged to measure the temperature at a point on the second disc.

14. A meter according to claim 6 in which discs of thermally insulating material are provided either side of the annular disc, in order to ensure that the heat flow is substantially radial from one circumferential surface to the other.

15. A meter according to claim 14 in which one or more guard rings, alternating with insulating rings are provided either side of the thermal bridge, these guard rings being exposed at their inner cylindrical surfaces to the flow of fluid from inlet to outlet and being thermally connected at their outer cylindrical surfaces by a sheath of relatively good thermally conductive material.

* * * * *